C. W. STARKER.
COVER FOR DYNAMO ELECTRIC MACHINES.
APPLICATION FILED OCT. 6, 1916.

1,238,590.

Patented Aug. 28, 1917.
3 SHEETS—SHEET 1.

WITNESSES:
R. J. Fitzgerald
O. W. Kennedy

INVENTOR
Charles W. Starker.
BY
Wesley G. Carr
ATTORNEY

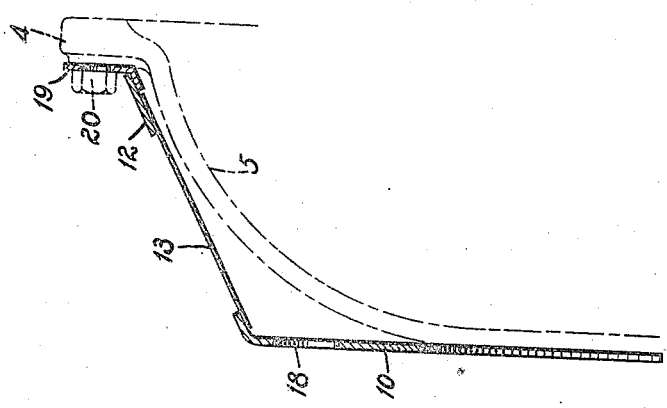
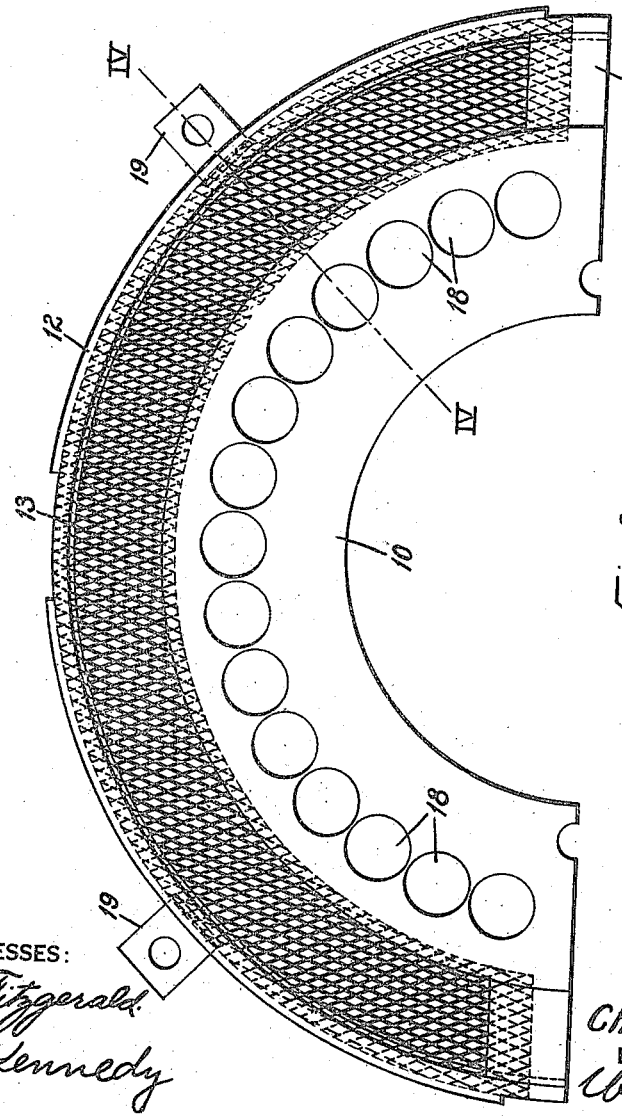

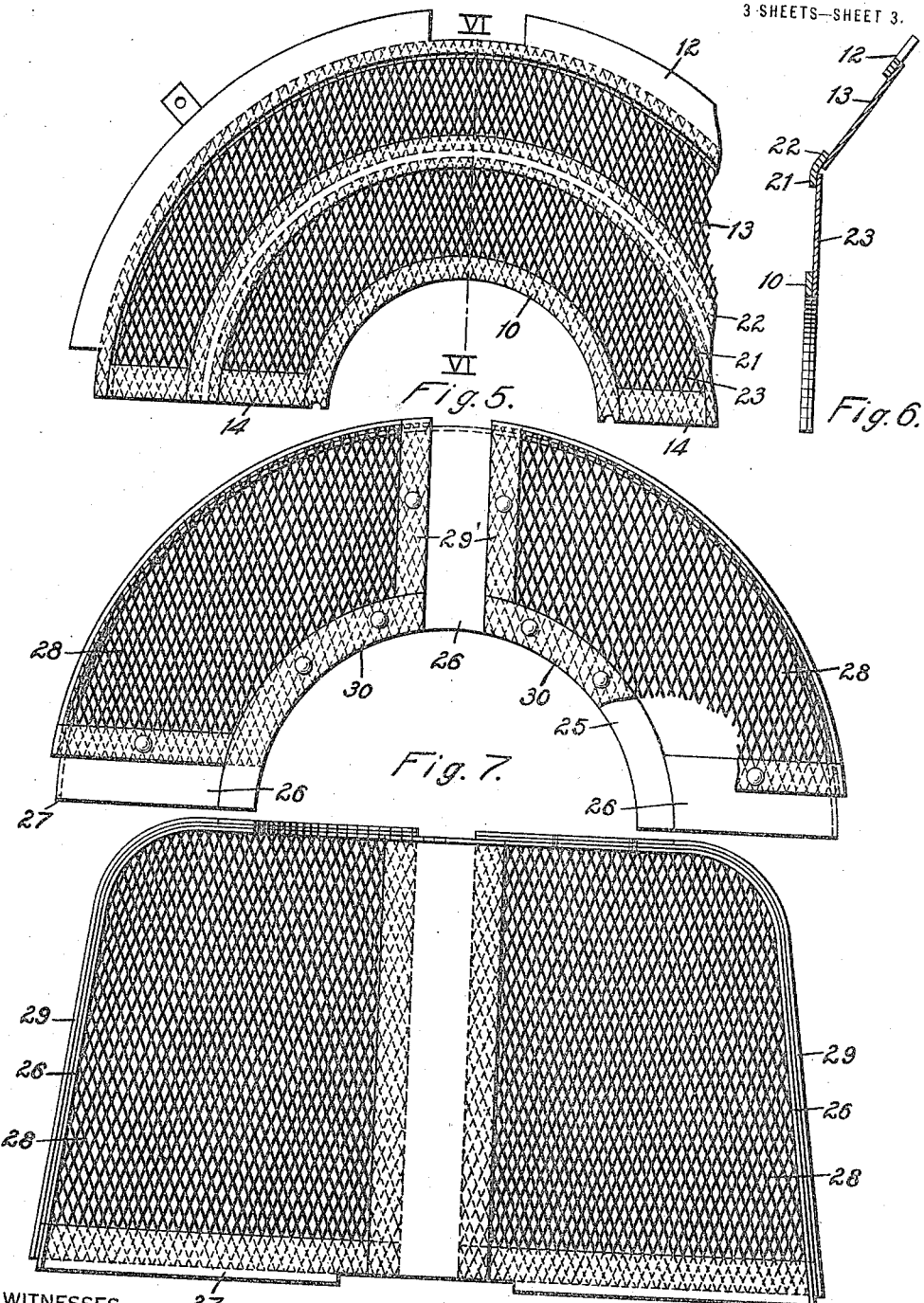

UNITED STATES PATENT OFFICE.

CHARLES W. STARKER, OF PITTSBURGH, PENNSYLVANIA, ASSIGNOR TO WESTINGHOUSE ELECTRIC & MANUFACTURING COMPANY, A CORPORATION OF PENNSYLVANIA.

COVER FOR DYNAMO-ELECTRIC MACHINES.

1,238,590.  Specification of Letters Patent.  Patented Aug. 28, 1917.

Application filed October 6, 1916. Serial No. 124,031.

*To all whom it may concern:*

Be it known that I, CHARLES W. STARKER, a subject of the Emperor of Germany, and a resident of Pittsburgh, in the county of Allegheny and State of Pennsylvania, have invented a new and useful Improvement in Covers for Dynamo-Electric Machines, of which the following is a specification.

My invention relates to covers for dynamo-electric machines and it has particular relation to protecting covers that are adapted for use in connection with dynamo-electric machines provided with end or bearing brackets of the semi-inclosing type.

The object of my invention is to provide a protecting cover that will prevent the entrance of foreign objects, such as tools and flying chips from metal working, into the spaces between the arms of the end brackets and, at the same time, will permit the substantially unobstructed passage of ventilating air through numerous small openings in the cover.

A further object of my invention is to provide a protecting cover that is simple and inexpensive in construction and that may be readily applied to existing types of end brackets.

Figure 1:
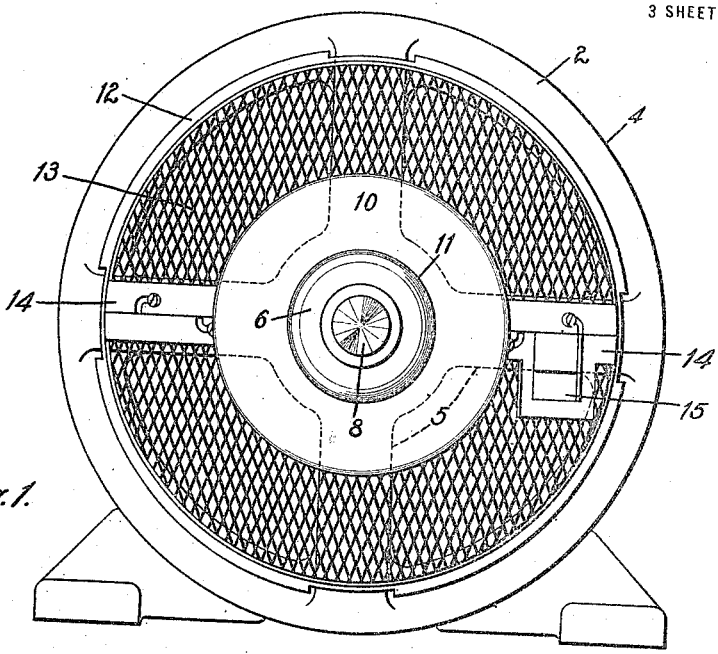
Figure 2:
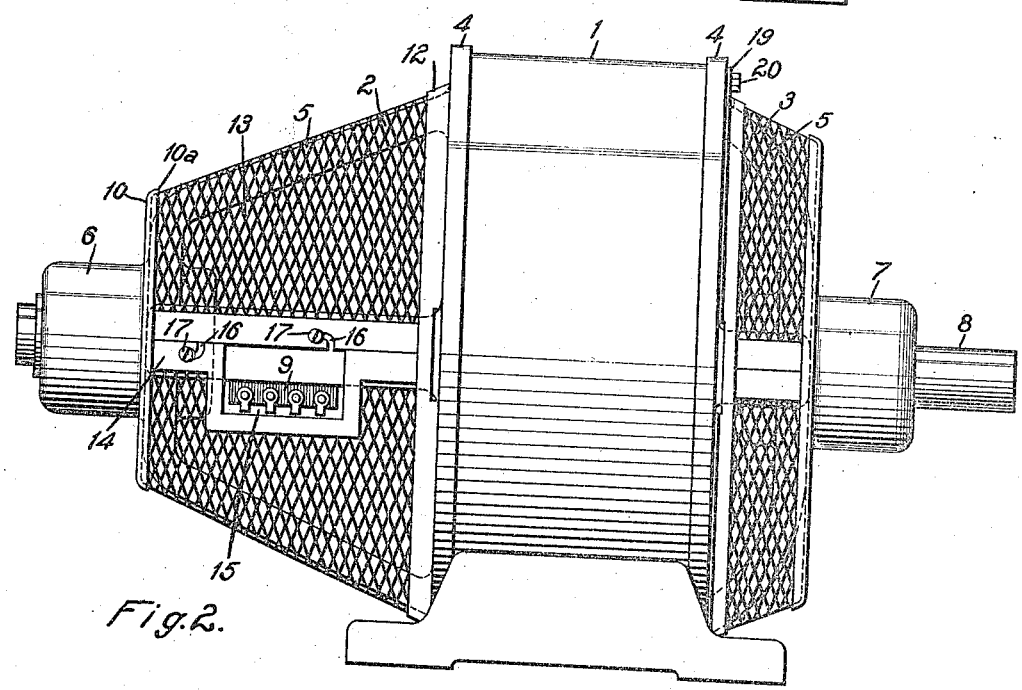

In the accompanying drawings, Figure 1 is a view, in end elevation, of a dynamo-electric machine provided with covers constructed in accordance with my invention; Fig. 2 is a view, in side elevation, of the machine shown in Fig. 1; Fig. 3 is an enlarged view, in end elevation, of one of the covers shown in Fig. 1; Fig. 4 is a sectional view, along the line IV—IV, of Fig. 3, and Figs. 5, 6, 7 and 8 are detail views respectively showing modifications of my invention.

A dynamo-electric machine comprises a frame 1 to the ends of which are secured brackets 2 and 3 which respectively comprise a supporting ring 4 and radially projecting arms 5 to support centrally located bearing housings 6 and 7. An armature shaft 8 is rotatably mounted in the bearings 6 and 7 and carries a commutator cylinder or other current-collecting devices (not shown) within the end bracket 2. A terminal board 9 is mounted on one of the arms 5 of the end bracket 2. The end bracket 2 will hereinafter be designated as the "front" end bracket, as distinguished from the "rear" end bracket 3.

The protecting cover for the front end bracket comprises an annular plate 10 provided with a central opening 11 of substantially the same diameter as the outside of the bearing housing 6 and a ring 12 having a substantially frusto-conical surface. A frusto-conical screen 13, preferably formed of expanded metal or of wire mesh having considerable mechanical strength, is secured to the inner periphery of the ring 12 and to a peripheral flange 10ª of the plate 10 by spot welding or otherwise. The cover further comprises radial ribs 14 which are secured to the plate 10 and the ring 12 and serve as additional supports for the expanded metal screen 13. One rib 14 is provided with a substantially rectangular opening 15 which is adapted to receive the terminal board 9. In order to expedite the assembly of the cover upon the bracket 2, it may be divided along the center lines of the ribs 14. The half portions of each rib 14 are then respectively provided with oppositely disposed L-shaped slots 16, and the several portions of the cover are secured to the end bracket 4 by means of bolts 17 coacting with the slots 16 and the arms 5 of the end bracket.

The cover for the rear end bracket 3 is constructed in substantially the same manner as the cover described with reference to the front end bracket 4, with the exception of certain modifications shown in Figs. 3 and 4. The annular plate 10 is provided with a plurality of spaced openings 18 arranged in substantially circumferential form, and the ring 12 is provided with radially extending fingers 19. The cover, as a whole, is secured to the end bracket 3 by means of bolts 20 coacting with the fingers 19 and the supporting ring 4 of the end bracket 3.

A modification in the form of the rear cover is shown in Figs. 5 and 6 wherein a ring having an annular portion 21 and a frusto-conical portion 22 is supported concentrically with respect to the plate 10 and the ring 12 by the ribs 14. A frusto-conical screen 13 is secured between the ring 12 and the portion 22 and an annular screen 23 is secured between the plate 10 and the portion 21.

A further modification in the form of both the front and rear covers is shown in Figs. 7 and 8. A frame for the screen comprises a ring 25 to which are secured radial arms 26 that are bent to substantially conform to the shape of the arms 5 of the end brackets. The ends of the arms 26 are joined together by a ring 27 having a substantially frusto-conical surface, the edge of which is butt welded to the arms. Sections 28 of expanded metal are formed over a suitable mold to the shape of the arms 25 and are disposed between the arms. The overlapping edges of each section 28 are covered by narrow strips 29 and by curved segmental pieces 30 that are welded or otherwise secured to the arms 26 and to the inner and outer rings 25 and 27, respectively, so that the whole cover forms a substantially unitary structure.

While I have shown my invention in several preferred forms, it is not so limited but is susceptible of various other modifications within the scope of the appended claims.

I claim as my invention:

1. The combination with a dynamo-electric machine provided with an end bracket, of a cover for said end bracket comprising a portion of expanded metal conforming to the shape of said end bracket.

2. The combination with a dynamo-electric machine provided with an end bracket, of a cover for said end bracket comprising a screen conforming to the shape of said bracket.

3. The combination with a dynamo-electric machine provided with an end bracket, of a cover for said end bracket comprising a screen of expanded metal conforming to the shape of said bracket.

4. The combination with a dynamo-electric machine provided with an end bracket having a plurality of spaced radial arms, of a cover for said bracket comprising portions of expanded metal disposed between said arms.

5. The combination with a dynamo-electric machine provided with an end bracket having a plurality of spaced radial arms, of a cover engaging the arms of said bracket and comprising portions of expanded metal disposed between said arms.

6. The combination with a dynamo-electric machine provided with an end bracket having a plurality of spaced radial arms, of a cover engaging the arms of said bracket and comprising a frusto-conical screen extending between said arms.

7. An inclosing cover for dynamo-electric machines comprising concentric annular members and a screen secured therebetween.

8. An inclosing cover for dynamo-electric machines comprising annular supporting members and a frusto-conical portion of expanded metal secured therebetween.

9. The combination with a dynamo-electric machine provided with an end bracket having a centrally located hub portion and a plurality of spaced radial arms, of a cover comprising a supporting member carried by said hub portion and a screen secured thereto and extending between said arms.

10. The combination with a dynamo-electric machine provided with an end bracket having a centrally located hub portion and a plurality of spaced radial arms, of a cover comprising a supporting member carried by said hub portion and a frusto-conical screen secured thereto and inclosing said end bracket.

11. The combination with a dynamo-electric machine provided with an end bracket having a centrally located hub portion and a plurality of spaced radial arms, and a rim portion carried by said arms, of a cover comprising supporting members carried by said hub portion and said rim portion respectively and a screen secured therebetween and inclosing said arms.

In testimony whereof, I have hereunto subscribed my name this 28th day of Sept. 1916.

CHARLES W. STARKER.

Copies of this patent may be obtained for five cents each, by addressing the "Commissioner of Patents, Washington, D. C."